(12) United States Patent
Nakao et al.

(10) Patent No.: US 7,868,977 B2
(45) Date of Patent: Jan. 11, 2011

(54) TRANSMISSIVE OCB LIQUID CRYSTAL DISPLAY DEVICE HAVING OPTICAL COMPENSATION ELEMENTS

(75) Inventors: Kenji Nakao, Kanazawa (JP); Kazuhiro Nishiyama, Kanazawa (JP); Mitsutaka Okita, Matto (JP); Daiichi Suzuki, Ishikawa-gun (JP); Shigesumi Araki, Ishikawa-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 253 days.

(21) Appl. No.: 11/441,008

(22) Filed: May 26, 2006

(65) Prior Publication Data

US 2006/0215093 A1 Sep. 28, 2006

Related U.S. Application Data

(63) Continuation of application No. PCT/JP2004/017176, filed on Nov. 18, 2004.

(30) Foreign Application Priority Data

Nov. 28, 2003 (JP) ............................... 2003-400614

(51) Int. Cl.
*G02F 1/1335* (2006.01)
(52) U.S. Cl. ..................... 349/117; 349/101; 349/119
(58) Field of Classification Search ................. 349/117, 349/101, 119
See application file for complete search history.

(56) References Cited

U.S. PATENT DOCUMENTS 5,774,197 A 6/1998 Nakamura
6,362,862 B1* 3/2002 Itoh et al. .................... 349/119
6,493,053 B1 12/2002 Miyachi et al.
2002/0041351 A1* 4/2002 Baek .......................... 349/114
2003/0011732 A1* 1/2003 Ishihara et al. .............. 349/117
2004/0095535 A1* 5/2004 Nakagawa .................. 349/117

FOREIGN PATENT DOCUMENTS

| CN | 1284708 | 2/2001 |
|---|---|---|
| EP | 1 087 254 A2 | 3/2001 |
| JP | 09-230332 | 9/1997 |
| JP | 10-197862 | 7/1998 |
| JP | 2001-117099 | 4/2001 |
| JP | 2001-343653 | 12/2001 |
| TW | 499603 | 8/1989 |

OTHER PUBLICATIONS

U.S. Appl. No. 11/441,009, filed May 26, 2006, Nakao, et al.
U.S. Appl. No. 12/270,392, filed Nov. 13, 2008, Okita, et al.

* cited by examiner

*Primary Examiner*—David Nelms
*Assistant Examiner*—Lauren Nguyen
(74) *Attorney, Agent, or Firm*—Oblon, Spivak, McClelland, Maier & Neustadt, L.L.P.

(57) ABSTRACT

Optical compensation elements include first phase plates and second phase plates, which have retardation in a front-plane direction. When a value $\Delta n/\Delta n_\lambda$ is set by normalizing a retardation amount $\Delta n \cdot d$ relating to light of each of wavelengths by a retardation amount $\Delta n_\lambda \cdot d$ relating to light of a predetermined wavelength $\lambda$, a normalized value $\Delta n/\Delta n_\lambda$ in the first phase plate is greater than a normalized value $\Delta n/\Delta n_\lambda$ in a liquid crystal layer, and a normalized value $\Delta n/\Delta n_\lambda$ in the second phase plate is less than the normalized value $\Delta n/\Delta n_\lambda$ in the liquid crystal layer, with respect to light of wavelengths other than the predetermined wavelength.

11 Claims, 5 Drawing Sheets

TRANSMISSIVE OCB LIQUID CRYSTAL DISPLAY DEVICE HAVING OPTICAL COMPENSATION ELEMENTS

CROSS REFERENCE TO RELATED APPLICATIONS

This is a Continuation Application of PCT Application No. PCT/JP2004/017176, filed Nov. 18, 2004, which was published under PCT Article 21 (2) in Japanese.

This application is based upon and claims the benefit of priority from prior Japanese Patent Application No. 2003-400614, filed Nov. 28, 2003, the entire contents of which are incorporated herein by reference.

BACKGROUND OF THE INVENTION

1. Field of the Invention

The present invention relates generally to a liquid crystal display device, and more particularly to a liquid crystal display device using an OCB (Optically Compensated Bend) technique, which can realize a wide viewing angle and high responsivity.

2. Description of the Related Art

Liquid crystal display devices have been applied to various fields, taking advantage of their features of light weight, small thickness and low power consumption.

In currently widely marketed twisted nematic (TN) type liquid crystal display devices, liquid crystal molecules with optically positive refractive-index anisotropy are oriented with a nearly 90° twist between a pair of substrates. In the TN liquid crystal display device, the optical rotating power of incident light on the liquid crystal layer is adjusted by controlling the twisted orientation of liquid crystal molecules. The TN liquid crystal display device can be relatively easily manufactured, but the viewing angle is narrow and the responsivity is low. Thus, the TN liquid crystal display device is not suitable, in particular, for motion picture display of TV video, etc.

On the other hand, attention has been paid to an OCB liquid crystal display device as a liquid crystal display device that can enhance the viewing angle and improve the responsivity. In the OCB liquid crystal display device, a liquid crystal layer that is held between a pair of substrates includes liquid crystal molecules that can be oriented with a bend. Compared to the TN liquid crystal display device, the OCB liquid crystal display device has an improved responsivity that is higher by an order of magnitude. In addition, the OCB liquid crystal display device advantageously has a wider viewing angle since the effect of birefringence light, which passes through the liquid crystal layer, is optically self-compensated by the orientation state of liquid crystal molecules.

In the case where an image is displayed by the OCB liquid crystal display device, black may be displayed by blocking light at a time of, e.g. high voltage application and white may be displayed by passing light at a time of low voltage application, with the control of birefringence and in combination with a polarizer plate.

When a black image is displayed, a majority of liquid crystal molecules are oriented in an electric-field direction by the high voltage application (i.e. oriented in a normal direction to the substrates). However, liquid crystal molecules in the vicinity of the substrates are not oriented in the normal direction due to interactions with the orientation films. Consequently, light that travels through the liquid crystal layer is affected by a phase difference in a predetermined direction. Owing to the effect of phase difference, in the case of viewing the screen from a front-face side (i.e. in the normal direction to the substrate), the transmittance cannot sufficiently be reduced when a black image is displayed, and the contrast deteriorates.

To cope with this problem, a uniaxial phase plate, for instance, may be incorporated in the OCB liquid crystal display device. Thereby, the phase difference of the liquid crystal layer is compensated when a black image is displayed, and the transmittance can sufficiently be reduced, as is conventionally known. Besides, Jpn. Pat. Appln. KOKAI Publication No. 10-197862, for instance, discloses that phase plates including hybrid-aligned optically negative anisotropy elements are combined, whereby a black image with a sufficiently low transmittance is displayed or gray-level characteristics are compensated when the screen is obliquely viewed.

In the structure of the conventional OCB liquid crystal display device, coloring occurs when the screen is viewed from the front-face side. In particular, bluish coloring is recognized.

BRIEF SUMMARY OF THE INVENTION

The present invention has been made in consideration of the above-described problem, and the object of the invention is to provide a liquid crystal display device with excellent display quality, which can increase a viewing angle and improve responsivity.

According to an aspect of the present invention, there is provided a liquid crystal display device characterized by comprising:

a liquid crystal panel that is configured to include a liquid crystal layer held between a pair of substrates; and an optical compensation element that optically compensates retardation of the liquid crystal layer in a predetermined display state in which a voltage is applied to the liquid crystal layer, wherein an image is displayed by varying a birefringence amount due to liquid crystal molecules included in the liquid crystal layer by the voltage applied to the liquid crystal layer, the optical compensation element includes at least a first phase plate and a second phase plate, which have retardation in a front-plane direction, and when a value $\Delta n/\Delta n_\lambda$ is set by normalizing a retardation amount $\Delta n \cdot d$ relating to light of each of wavelengths ($\Delta n = n_e - n_o$ ($n_e$: extraordinary-ray refractive index, $n_o$: ordinary-ray refractive index), and d is thickness) by a retardation amount $\Delta n_\lambda \cdot d$ relating to light of a predetermined wavelength $\lambda$, a normalized value $\Delta n/\Delta n_\lambda$ in the first phase plate is greater than a normalized value $\Delta n/\Delta n_\lambda$ in the liquid crystal layer, and a normalized value $\Delta n/\Delta n_\lambda$ in the second phase plate is less than the normalized value $\Delta n/\Delta n_\lambda$ in the liquid crystal layer, with respect to light of wavelengths other than the predetermined wavelength.

DETAILED DESCRIPTION OF THE INVENTION

A liquid crystal display device according to an embodiment of the present invention will now be described with reference to the accompanying drawings. In this embodiment, in particular, an OCB liquid crystal display device that adopts an OCB (Optically Compensated Bend) mode as a display mode is described as an example of the liquid crystal display device.

Figure 1:
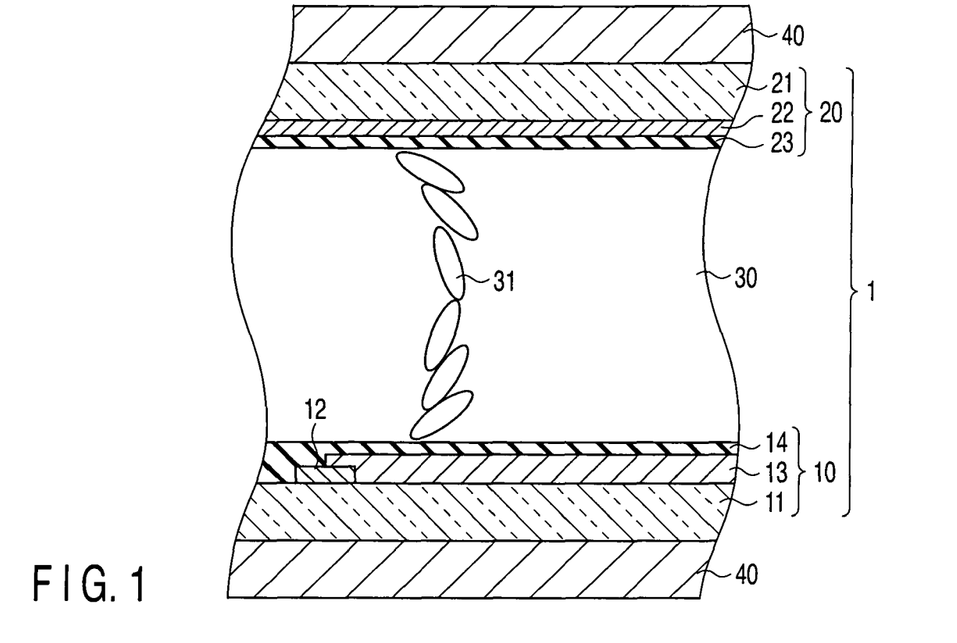
FIG. 1 is a cross-sectional view that schematically shows the structure of an OCB liquid crystal display device according to an embodiment of the present invention.

As is shown in FIG. 1, the OCB liquid crystal display device includes a liquid crystal panel 1 that is configured such that a liquid crystal layer 30 is held between a pair of substrates, that is, an array substrate 10 and an opposed substrate 20. The liquid crystal panel 1 is, for example, of a transmissive type and is configured to pass backlight from a backlight unit (not shown) from the array substrate 10 side to the opposed substrate 20 side.

The array substrate 10 is formed using an insulating substrate 11 of, e.g. glass. The array substrate 10 includes an active element 12, a pixel electrode 13 and an orientation film 14 on one major surface of the insulating substrate 11. The active element 12 is disposed for each pixel and is composed of, e.g. a TFT (Thin Film Transistor) or a MIM (Metal Insulated Metal). The pixel electrode 13 is electrically connected to the active element 12 that is disposed for each pixel. The pixel electrode 13 is formed of a light-transmissive, electrically conductive material such as ITO (Indium Tin Oxide). The orientation film 14 is disposed so as to cover the entire major surface of the insulating substrate 11.

The opposed substrate 20 is formed using an insulating substrate 21 of, e.g. glass. The opposed substrate 20 includes a counter-electrode 22 and an orientation film 23 on one major surface of the insulating substrate 21. The counter-electrode 22 is formed of a light-transmissive, electrically conductive material such as ITO. The orientation film 23 is disposed so as to cover the entire major surface of the insulating substrate 21.

In the color-display type liquid crystal display device, the liquid crystal panel 1 includes color pixels of a plurality of colors, e.g. red (R), green (G) and blue (B). Specifically, the red pixel has a red color filter that mainly passes light of a red wavelength. The green pixel has a green color filter that mainly passes light of a green wavelength. The blue pixel has a blue color filter that mainly passes light of a blue wavelength. These color filters are disposed on the major surface of the array substrate 10 or opposed substrate 20.

The array substrate 10 and opposed substrate 20 having the above-described structures are attached to each other with a predetermined gap via spacers (not shown). The liquid crystal layer 30 is formed of a liquid crystal composition that is sealed in the gap between the array substrate 10 and opposed substrate 20. A material, which contains liquid crystal molecules 31 with positive dielectric-constant anisotropy and optically positive uniaxiality, can be chosen for the liquid crystal layer 30.

Figure 2:
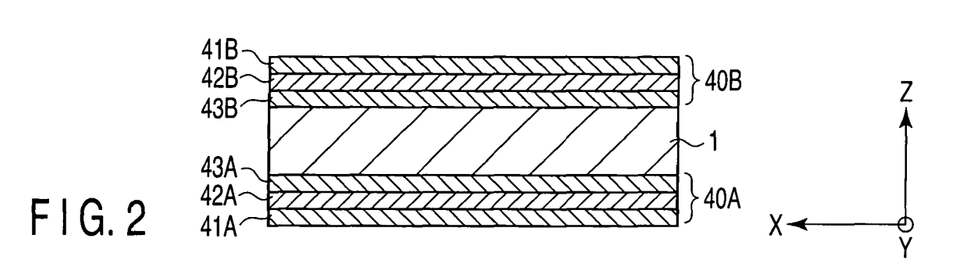
FIG. 2 schematically shows the structure of optical compensation elements that are applied to the OCB liquid crystal display device.

The OCB liquid crystal display device includes optical compensation elements 40 that optically compensate retardation of the liquid crystal layer 30 in a predetermined display state in which a voltage is applied to the liquid crystal layer 30. As is shown in FIG. 2, for example, the optical compensation elements 40 are provided on the array substrate (10)-side outer surface of the liquid crystal panel 1 and on the opposed substrate (20)-side outer surface of the liquid crystal panel 1.

The optical compensation element 40A on the array substrate 10 side includes a polarizer plate 41A and a plurality of phase plates 42A and 43A. Similarly, the optical compensation element 40B on the opposed substrate 20 side includes a polarizer plate 41B and a plurality of phase plates 42B and 43B. Each of the phase plates 42A and 42B functions as a phase plate having retardation (phase difference) in its thickness direction, as will be described later. In addition, each of the phase plates 43A and 43B functions as a phase plate having retardation (phase difference) in its front-plane direction, as will be described later.

Figure 3:
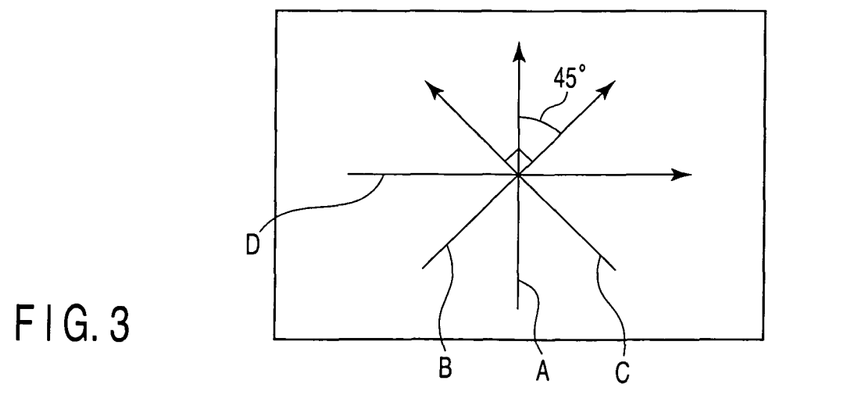
FIG. 3 shows the relationship between the optical-axis directions of optical members of the optical compensation element shown in FIG. 2 and the direction of orientation of liquid crystal.

As is shown in FIG. 3, the orientation films 14 and 23 are subjected to a parallel orientation process (i.e. rubbed in a direction of arrow A in FIG. 3). Thereby, an orthogonal projection of the optical axis of the liquid crystal molecules 31 (i.e. direction of liquid crystal orientation) becomes parallel to the direction of arrow A. In a state in which an image can be displayed, that is, in a state in which a predetermined bias is applied, the liquid crystal molecules 31 are oriented with a bend, as shown in FIG. 1, in a cross section of the liquid crystal layer 30, which is defined by the arrow A, between the array substrate 10 and opposed substrate 20.

In this case, the polarizer plate 41A is so disposed as to have a transmission axis in a direction of arrow B in FIG. 3. In addition, the polarizer plate 41B is so disposed as to have a transmission axis in a direction of arrow C in FIG. 3. The transmission axes of the polarizer plates 41A and 41B are inclined at 45° to the direction A of liquid crystal orientation and intersect at right angles with each other. This configuration in which the transmission axes of the two polarizer plates intersect at right angles with each other is called "crossed Nicols". If a birefringence amount (retardation amount) of an object lying between the two polarizer plates is effectively 0, no light passes (zero transmittance) and a black image is displayed.

In the OCB liquid crystal display device, even if a high voltage is applied to the bend-oriented liquid crystal molecules, all liquid crystal molecules are not oriented in the normal direction of the substrates and the retardation of the liquid crystal layer does not completely become zero. For example, in the liquid crystal panel 1 shown in FIG. 1, when a potential difference of 4.5V was applied between the pixel electrode 13 and counter-electrode 22, the retardation amount of the liquid crystal layer 30 was 60 nm.

The optical compensation elements 40 include phase plates that have such retardation as to cancel the retardation of the liquid crystal layer 30, which has an effect when the screen is viewed from the front-face side in a predetermined voltage application state (e.g. in a state in which a black image is displayed by high voltage application). The optical axis of such phase plates is parallel to a direction D that is perpendicular to the direction in which retardation occurs in the liquid crystal layer 30, that is, the direction A of liquid crystal orientation, and the phase plates have retardation in the direction D. Each of these phase plate corresponds to the "phase plate having retardation in its front-plane direction" 43A, 43B. The front-plane direction, in this context, is an in-plane direction defined by an X direction and a Y direction, that is, defined by the major surface of the liquid crystal panel 1. The refractive indices of the optical members, such as the liquid crystal layer and phase plates, are set in consideration of not only principal refractive indices nx and ny in the plane, but also all the principal refractive indices nx, ny and nz at the time each optical member is orthogonal-projected in the plane.

Thereby, the retardation of the liquid crystal layer 30 in the front-plane direction can be canceled, and the retardation amount can be reduced to effectively zero by the combination of the liquid crystal layer 30 and phase plates 43A and 43B. Thus, when the screen is viewed from the front-face side, a black image can be displayed with a sufficiently decreased transmittance. In other words, the black display state corresponds to the display state in which the retardation amount of the liquid crystal layer 30 is adjusted by the application voltage and balanced with the retardation amount of the phase plates 43A and 43B.

As described above, in the OCB liquid crystal display device, the display quality of the black image, when viewed from the front side, can be improved by the above-described mechanism using the phase plates 43A and 43B that have retardation in the front-plane direction. However, this is not the complete adjustment by phase plates that are included in the optical compensation elements 40. One of the features of the OCB liquid crystal display device is a wide viewing angle. The OCB liquid crystal display device does not necessarily have a wide viewing angle. A wide viewing angle can be obtained by adjusting and balancing the retardations of the liquid crystal layer and the phase plates.

In the liquid crystal display device having the feature of a wide viewing angle, the viewing angle characteristics of a black image are particularly important. The reason is that the quality of blackness of a black image greatly affects the sharpness and contrast of a display image. Consideration will now be given to optical compensation by which a wide viewing angle is realized when a black image is displayed, that is, a black image with a sufficiently reduced transmittance can be displayed even if the image is viewed at any angle.

Figure 4:
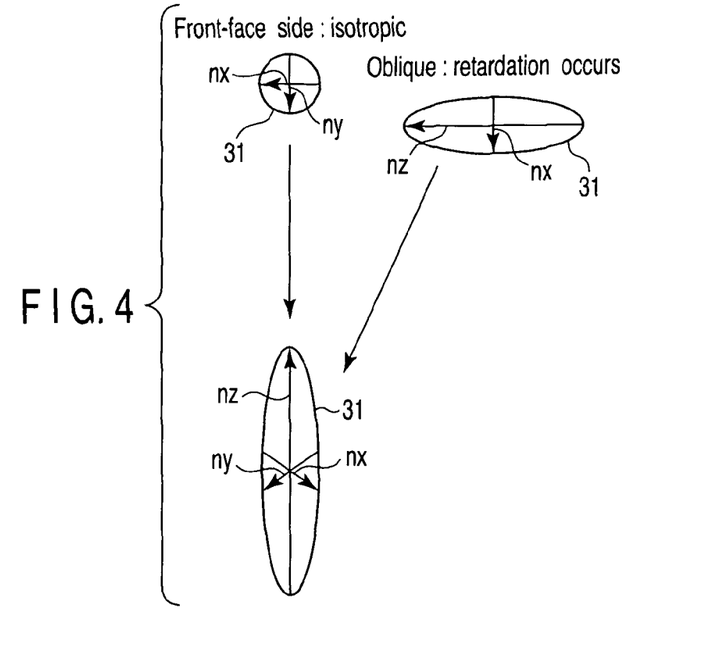
FIG. 4 is a view for explaining retardation that occurs in the liquid crystal layer when the screen is observed in an oblique direction.

When a black image is displayed on the OCB liquid crystal display device, a relatively high voltage is applied to the liquid crystal layer 30. Thus, a majority of liquid crystal molecules 31 are oriented in the direction of electric field (i.e. erected in the normal direction of the substrate). The liquid crystal molecule 31 is a molecule having such positive uniaxial optical characteristics that a principal refractive index nz in the major-axis direction of the molecule is greater than each of principal refractive indices nx and ny in other directions, as shown in FIG. 4. For the purpose of convenience, the major-axis direction (i.e. thickness direction) of the liquid crystal molecule 31 is referred to as a Z direction, and in-plane directions that are perpendicular to the major-axis direction are referred to as an X direction and a Y direction.

In the state in which the liquid crystal molecule 31 is erected in the normal direction of the substrate, the distribution of principal refractive indices is isotropic (i.e. the in-plane principal refractive indices are equal (nx=ny)) when the screen is viewed from the front-face side, and thus no retardation occurs. However, when the screen is viewed in an oblique direction, the effect of the principal refractive index nz of the liquid crystal molecule 31 is not negligible (nx, ny<nz), and thus retardation occurs in accordance with the direction in which the screen is viewed. Consequently, part of the light traveling through the liquid crystal layer 30 passes through the crossed-Nicol polarizer plates 41A and 41B. In other words, the transmittance cannot sufficiently be reduced, and a black image cannot be displayed.

To cope with this problem, the optical compensation element 40 includes a phase plate having optical characteristics (e.g. negative uniaxiality) that are reverse to the optical characteristics of the liquid crystal molecule 31. This phase plate has a relatively small principal refractive index nz in its thickness direction and relatively large principal refractive indices nx and ny (nx, ny>nz). This phase plate corresponds to the "phase plate having retardation in its thickness direction" 42A, 42B. The thickness direction, in this context, is a direction that is defined, in addition to the in-plane X direction and Y direction, by a Z direction that is perpendicular to the X direction and Y direction. The refractive index of each of the optical members, such as the liquid crystal layer and phase plates, is set in consideration of all principal refractive indices nx, ny and nz in the three-dimensional fashion.

By using the phase plates 42A and 42B combined, the retardation in the liquid crystal layer 30 can be canceled when the screen in the black display state is viewed in an oblique direction.

Figure 5:
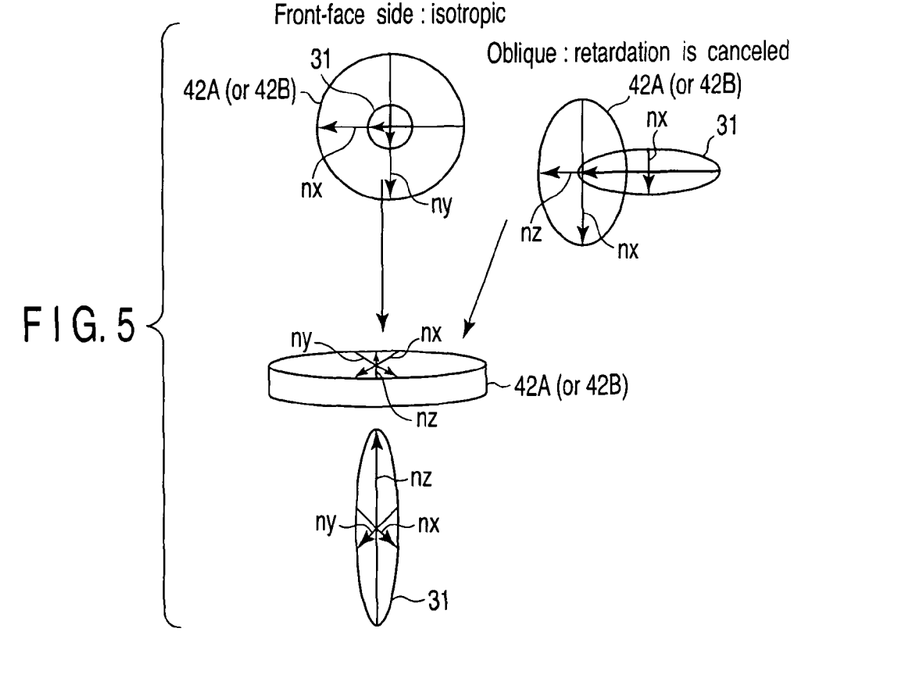
FIG. 5 is a view for explaining optical compensation of retardation that occurs in the liquid crystal layer, as shown in FIG. 4.

Specifically, as shown in FIG. 5, when the screen is viewed from the front-face side, the distribution of principal refractive indices is isotropic (i.e. the in-plane principal refractive indices are equal (nx=ny)) both in the liquid crystal molecule 31 and the phase plate 42A (or 42B), and no retardation occurs. On the other hand, when the screen is obliquely viewed, the retardation occurring in the liquid crystal molecule 31 intersects the retardation occurring in the phase plate 42A (or 42B). That is, the distribution of principal refractive indices in the liquid crystal molecule 31 becomes nx, ny<nz, and such retardation occurs in the liquid crystal layer 30 that the effect of the principal refractive index nz in the thickness direction is dominant. On the other hand, the distribution of principal refractive indices in the phase plate 42A (or 42B) becomes nx, ny>nz, and such retardation occurs in the phase plate that the effect of the principal refractive index nx or ny in the plane perpendicular to the thickness direction is dominant.

If the absolute values of the amounts of retardations in the liquid crystal layer and phase plate are made substantially equal, these retardations can be canceled. Thereby, the retardation in the thickness direction of the liquid crystal layer 30 can be canceled, and the state in which the retardation amount is effectively zero can be realized by combining the liquid crystal layer 30 and phase plates 42A and 42B. Thus, even when the screen is obliquely viewed, a black image with a sufficiently reduced transmittance can be displayed.

As stated above, the basic approach to realize a wide viewing angle in the OCB liquid crystal display device is to cancel the retardation occurring in the liquid crystal layer in the front-plane direction by the "phase plates having retardation in the front-plane direction" and to cancel the retardation occurring in the liquid crystal layer in the oblique direction by the "phase plates having retardation in the thickness direction".

In the above description, the single wavelength has been considered. Conventionally, in order to place importance on luminance, retardation has been adjusted so as to optimize the characteristics at the green wavelength of 550 nm or thereabout. However, in both the liquid crystal layer and the phase plates, the principal refractive indices nx, ny and nz have wavelength dependency.

Figure 6:
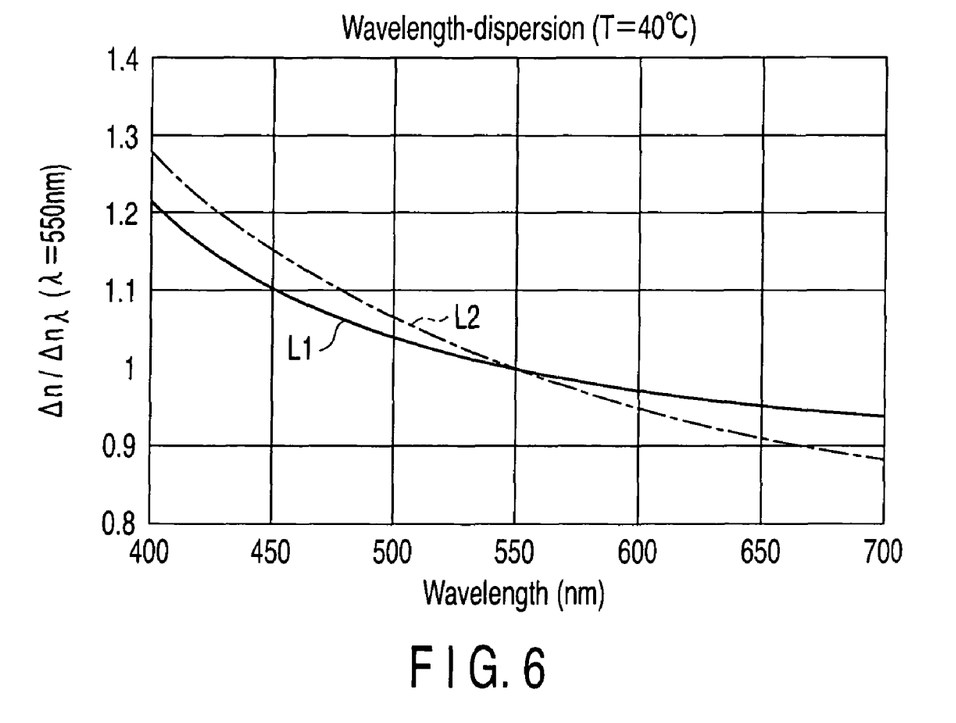
FIG. 6 shows an example of wavelength-dispersion characteristics of a retardation amount $\Delta n \cdot d$ in each of the optical members in the liquid crystal display device with the structure shown in FIG. 2.

FIG. 6 shows an example of wavelength-dispersion characteristics of retardation amounts $\Delta n \cdot d$ of the liquid crystal layer and the phase plate having retardation in the front-plane direction. In FIG. 6, the abscissa indicates the wavelength (nm), and the ordinate indicates a value $\Delta n/\Delta n_\lambda$, which is obtained by normalizing the retardation amount $\Delta n \cdot d$ relating to light of each wavelength by the retardation amount $\Delta n_\lambda \cdot d$ relating to light of a predetermined wavelength, i.e. $\lambda$=550 nm. That is, FIG. 6 shows the wavelength-dispersion characteristics of the value $\Delta n/\Delta n_\lambda$. In this case, $\Delta n$=ne−no (ne: extraordinary-ray refractive index, no: ordinary-ray refractive index), and $\underline{d}$ is the thickness of the optical element. In FIG. 6, a solid line L1 corresponds to the liquid crystal layer, and a dot-and-dash line L2 corresponds to the phase plate having retardation in the front-plane direction.

As is understood, even if proper optical compensation is performed at a wavelength of 550 nm, proper adjustment cannot be effected at different wavelengths and a problem of coloring arises. In particular, at wavelengths less than 550 nm, the wavelength-dispersion characteristics of the phase plate having retardation in the front-plane direction are greatly different from those of the liquid crystal layer. Consequently, when the screen is viewed from the front-face side, the retardation of the liquid crystal layer cannot fully be canceled. In particular, when the screen is observed from the front-face side, bluish coloring is recognized. In this example, a PC (polycarbonate) film is used as the phase plate having retardation in the front-plane direction.

In order to compensate the difference in wavelength-dispersion characteristics between the liquid crystal layer and the phase plate having retardation in the front-plane direction, the optical compensation element includes at least two phase plates (i.e. first phase plate and second phase plate) having retardation in the front-plane direction. Embodiments of the OCB liquid crystal display device having such optical compensation elements will be described.

First Embodiment

Figure 7:
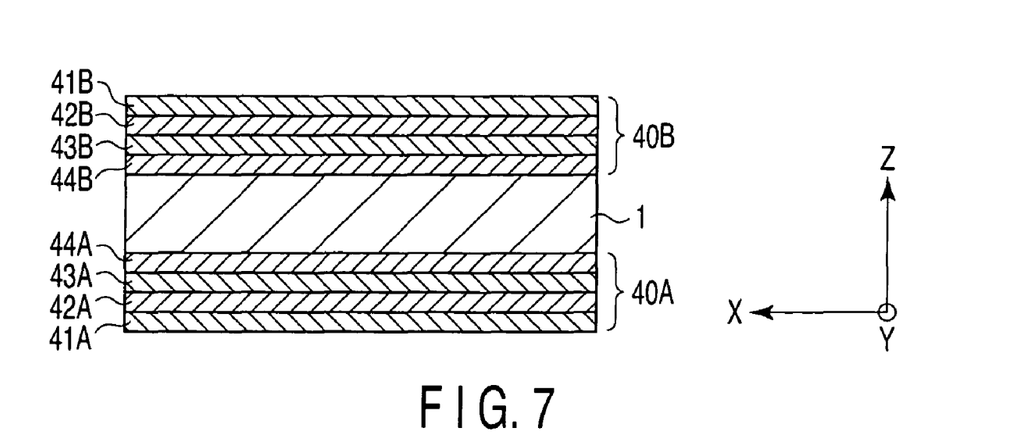
FIG. 7 schematically shows the structure of an OCB liquid crystal display device according to a first embodiment of the invention.

As is shown in FIG. 7, in an OCB liquid crystal display device according to a first embodiment, optical compensation elements 40A and 40B are provided on the array substrate (10)-side outer surface of the liquid crystal panel 1 and on the opposed substrate (20)-side outer surface of the liquid crystal panel 1.

The optical compensation element 40A on the array substrate 10 side includes a polarizer plate 41A, a phase plate 42A having retardation in its thickness direction, a first phase plate 43A having retardation in its front-plane direction, and a second phase plate 44A having retardation in its front-plane direction. Similarly, the optical compensation element 40B on the opposed substrate 20 side includes a polarizer plate 41B, a phase plate 42B having retardation in its thickness direction, a first phase plate 43B having retardation in its front-plane direction, and a second phase plate 44B having retardation in its front-plane direction. The transmission-axis direction of the polarizer plate and the optical-axis directions of the respective phase plates, relative to the liquid crystal orientation direction, are the same as those in the example shown in FIG. 2 and FIG. 3.

The first phase plates 43A and 43B are, for instance, PC films, as in the above-described example. The first phase plates 43A and 43B have wavelength-dispersion characteristics as shown by L2 in FIG. 6. Specifically, with respect to light of shorter wavelengths than the predetermined wavelength (550 nm), the normalized value $\Delta/\Delta n_\lambda$ in the first phase plate 43A, 43B is greater than the normalized value $\Delta n/\Delta n_\lambda$ in the liquid crystal layer 30.

In this case, the second phase plates 44A and 44B, which are to be chosen, should have such wavelength-dispersion characteristics as to compensate the difference in wavelength-dispersion characteristics between the liquid crystal layer 30 and the first phase plates 43A and 43B. In other words, with respect to light of shorter wavelengths than the predetermined wavelength (550 nm), the normalized value $\Delta n/\Delta n_\lambda$ in the second phase plate 44A, 44B needs to be less than the normalized value $\Delta n/\Delta n_\lambda$ in the liquid crystal layer 30. The second phase plates 44A and 44B, which meet this condition, have the advantage of canceling the difference in wavelength-dispersion characteristics between the first phase plates and the liquid crystal layer.

For instance, drawn TAC (triacetyl cellulose) films are usable as the second phase plates 44A and 44B. The direction of drawing of TAC films is set to be the same as the direction of retardation of the first phase plates.

Figure 8:
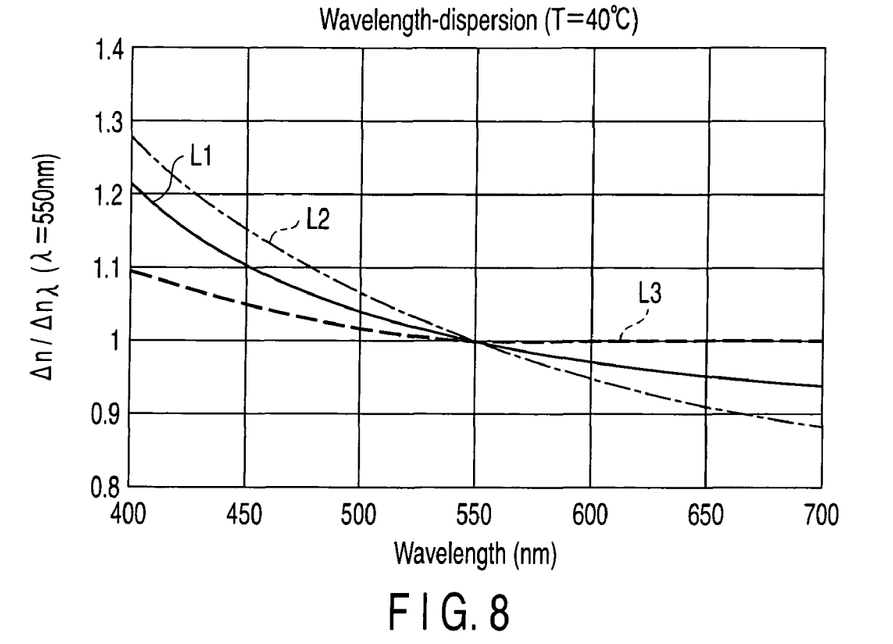
FIG. 8 shows an example of wavelength-dispersion characteristics of a retardation amount $\Delta n \cdot d$ in each of optical members in the liquid crystal display device with the structure shown in FIG. 7.

FIG. 8 shows an example of wavelength-dispersion characteristics of retardation amounts $\Delta n \cdot d$ of the liquid crystal layer, the first phase plate and the second phase plate. Like FIG. 6, FIG. 8 shows the wavelength-dispersion characteristics of the value $\Delta n/\Delta n_\lambda$, which is obtained by normalizing the retardation amount $\Delta n \cdot d$ relating to light of each wavelength by the retardation amount $\Delta n_\lambda \cdot d$ relating to light of the predetermined wavelength, i.e. $\lambda$=550 nm. In FIG. 8, a solid line L1 corresponds to the liquid crystal layer, a dot-and-dash line L2 corresponds to the first phase plate, and a broken line L3 corresponds to the second phase plate.

As is shown in FIG. 8, at wavelengths shorter than the predetermined wavelength, the wavelength-dispersion characteristics of the first phase plate are higher than those of the liquid crystal layer, and the wavelength-dispersion characteristics of the second phase plate are lower than those of the liquid crystal layer. In other words, in a visible wavelength range between 400 nm and 700 nm (or in a range of wavelengths shorter than the predetermined wavelength of 550 nm), a difference between a maximum value and a minimum value of $\Delta n/\Delta n_\lambda$ is greater in the first phase plate than in the liquid crystal layer and is smaller in the second phase plate than in the liquid crystal layer. Further, in other words, in the visible wavelength range between 400 nm and 700 nm (or in the range of wavelengths shorter than the predetermined wavelength of 550 nm), the inclination of the wavelength-dispersion characteristic curve is greater in the first phase plate than in the liquid crystal layer and is smaller in the second phase plate than in the liquid crystal layer.

Specifically, the first phase plate, which has higher wavelength-dispersion characteristics of $\Delta n/\Delta n_\lambda$ than those of the liquid crystal layer, is combined with the second phase plate, which has lower wavelength-dispersion characteristics of $\Delta n/\Delta n_\lambda$ than those of the liquid crystal layer. Thereby, the comprehensive wavelength-dispersion characteristics of the first phase plate and second phase plate are made to be substantially equal to the wavelength-dispersion characteristics of the liquid crystal layer. Thus, when the screen is viewed from the front-face side, retardation occurring in the liquid crystal layer can be canceled, and the wavelength-dispersion characteristics of retardation in the liquid crystal layer can be compensated.

Hence, when the screen is viewed from the front-face side, the transmittance of the liquid crystal panel can sufficiently be reduced and the contrast is enhanced. Moreover, a black image with little coloring can be displayed. Therefore, a liquid crystal display device with excellent viewing-angle characteristics and display quality can be provided.

The above-described optical compensation element 40 can be fabricated, for example, by adding the second phase plate, which has the function of adjusting the comprehensive wavelength-dispersion characteristics of the liquid crystal display device, to the optical element in which the polarizer plate, the phase plate with retardation in its thickness direction and the first phase plate with retardation in its front-plane direction are integrally constructed. For example, the optical compensation element 40 is fabricated by coating a material, which functions as the second phase plate with retardation in the front-plane direction, or attaching a film, which functions as the second phase plate, to the surface of this optical element. In short, the optical compensation element includes the second phase plate on its side closest to the liquid crystal panel.

Alternatively, the optical compensation element may be configured such that the first phase plate is provided on the surface of the optical element in which the second phase plate as well as the polarizer plate, etc. are integrally constructed. In this case, the first phase plate is provided on the side closest to the liquid crystal panel.

If the optical compensation element is manufactured by the above-described method, the manufacturing process can be simplified, the manufacturing cost can be reduced, and the cost of the optical compensation element can be reduced. This method is very advantageous in the manufacturing process.

Preferably, the second phase plate (or first phase plate) should have such a thickness as to provide a retardation amount that is substantially equal to the difference between the retardation amount in the first phase plate (or second phase plate) and the retardation amount in the liquid crystal layer with respect to light of the same wavelength. Specifically, the retardation amount, as described above, depends on the thickness $\underline{d}$ of each optical member. Thus, optimization for canceling the retardation amount of the liquid crystal layer can be executed by adjusting the combination of thicknesses of the phase plates that constitute the optical compensation element and have retardations in the front-plane direction.

In short, a relatively small thickness is set for the phase plate that has wavelength-dispersion characteristics of $\Delta n/\Delta n_\lambda$ with a relatively small difference from those of the liquid crystal layer. A relatively large thickness is set for the phase plate that has wavelength-dispersion characteristics of $\Delta n/\Delta n_\lambda$ with a relatively large difference from those of the liquid crystal layer. In the example shown in FIG. 8, a difference between the wavelength-dispersion characteristics of $\Delta n/\Delta n_\lambda$ of the first phase plate and those of the liquid crystal layer is nearly equal to a difference between the wavelength-dispersion characteristics of $\Delta n/\Delta n_\lambda$ of the second phase plate and those of the liquid crystal layer. It is thus desirable that the thickness of the second phase plate be set to be equal to the thickness of the first phase plate. In the first embodiment, an optimal result was obtained when the thickness of the first phase plate 43A, 43B was set at 100 μm and the thickness of the second phase plate 44A, 44B was set at 100 μm.

Second Embodiment

Figure 9:
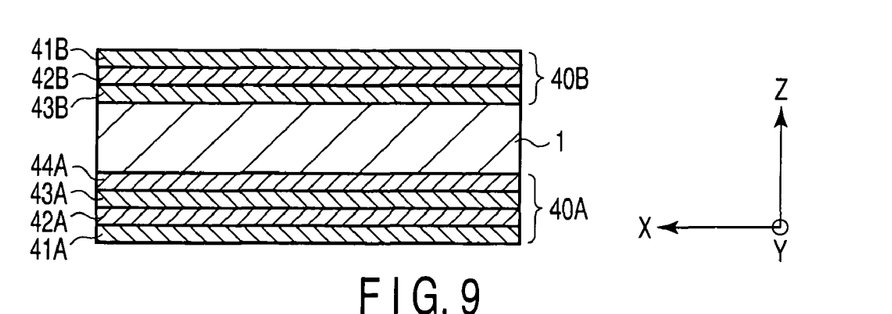
FIG. 9 schematically shows the structure of an OCB liquid crystal display device according to a second embodiment of the invention.

As is shown in FIG. 9, like the first embodiment, in an OCB liquid crystal display device according to a second embodiment, optical compensation elements 40A and 40B are provided on the array substrate (10)-side outer surface of the liquid crystal panel 1 and on the opposed substrate (20)-side outer surface of the liquid crystal panel 1. The structural components common to those in the first embodiment are denoted by like reference numerals, and a detailed description thereof is omitted.

The optical compensation element 40A on the array substrate 10 side includes a polarizer plate 41A, a phase plate 42A having retardation in its thickness direction, a first phase plate 43A having retardation in its front-plane direction, and a second phase plate 44A having retardation in its front-plane direction. On the other hand, the optical compensation element 40B on the opposed substrate 20 side includes a polarizer plate 41B, a phase plate 42B having retardation in its thickness direction, and a first phase plate 43B having retardation in its front-plane direction. The optical compensation element 40B does not include a phase plate that corresponds to the second phase plate.

As has been described above, the second phase plate (or first phase plate) should preferably have such a thickness as to provide a retardation amount that is substantially equal to the difference between the retardation amount in the first phase plate (or second phase plate) and the retardation amount in the liquid crystal layer with respect to light of the same wavelength.

Thus, optimization for canceling the retardation amount of the liquid crystal layer may be executed by combining the thicknesses of the plural phase plates that constitute the optical compensation element and have retardations in the front-plane direction ($\Delta n_{LC} \cdot d_{LC} \approx \Delta n_1 \cdot d_1 + \Delta n_2 \cdot d_2$; where $\Delta n_{LC}$, $\Delta n_1$, and $\Delta n_2$ are $\Delta n$ in the liquid crystal layer, first phase plate and second phase plate, respectively, and $d_{LC}$, $d_1$ and $d_2$ are $\underline{d}$ in the liquid crystal layer, first phase plate and second phase plate, respectively). In other words, no problem arises if the comprehensive wavelength-dispersion characteristics of the two first phase plates 43A and 43B in the liquid crystal display device are canceled with the wavelength-dispersion characteristics of the single second phase plate 44A, and the resultant wavelength-dispersion characteristics of the phase plates are substantially equal to those of the liquid crystal layer 30.

In the second embodiment, when the first phase plate and second phase plate with the wavelength dispersion characteristics as shown in FIG. 8 were applied, an optimal result was obtained by setting the thickness of the first phase plate 43A, 43B at 100 μm and setting the thickness of the second phase plate 44A at 200 μm, i.e. double the thickness of the first phase plate.

According to the second embodiment, the same advantageous effect as with the first embodiment is obtained. In addition, since the second phase plate is provided on one optical compensation element alone, the number of optical members can be reduced and the cost can be reduced.

Third Embodiment

Figure 10:
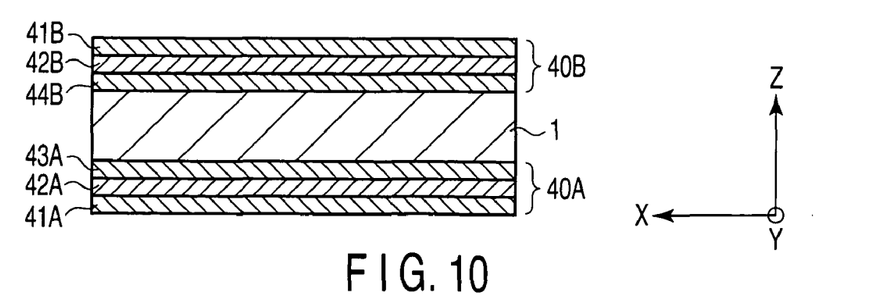
FIG. 10 schematically shows the structure of an OCB liquid crystal display device according to a third embodiment of the invention.

As is shown in FIG. 10, like the first embodiment, in an OCB liquid crystal display device according to a third embodiment, optical compensation elements 40A and 40B are provided on the array substrate (10)-side outer surface of the liquid crystal panel 1 and on the opposed substrate (20)-side outer surface of the liquid crystal panel 1. The structural components common to those in the first embodiment are denoted by like reference numerals, and a detailed description thereof is omitted.

The optical compensation element 40A on the array substrate 10 side includes a polarizer plate 41A, a phase plate 42A having retardation in its thickness direction, and a first phase plate 43A having retardation in its front-plane direction. On the other hand, the optical compensation element 40B on the opposed substrate 20 side includes a polarizer plate 41B, a phase plate 42B having retardation in its thickness direction, and a second phase plate 44B having retardation in its front-plane direction.

In the third embodiment, when the first phase plate and second phase plate with the wavelength dispersion characteristics as shown in FIG. 8 were applied, an optimal result was obtained by setting the thickness of the first phase plate 43A at 200 μm and setting the thickness of the second phase plate 44B at 200 μm.

According to the third embodiment, the same advantageous effect as with the first embodiment is obtained. In addition, since the first phase plate is provided on one optical compensation element alone and the second phase plate is provided on the other optical compensation element alone, the number of optical members can further be reduced and the cost can be reduced.

As has been described in connection with the first to third embodiments, when the liquid crystal display device is constructed, it should suffice if each of the optical compensation elements includes at least one of the optical members functioning as the first phase plate and second phase plate. In other words, the optical member functioning as the first phase plate may be included in at least one of the optical compensation element 40A on the array substrate 10 side and the optical compensation element 40B on the opposed substrate side. Similarly, the optical member functioning as the second phase plate may be included in at least one of the optical compensation element 40A on the array substrate 10 side and the optical compensation element 40B on the opposed substrate side. In brief, it is important to consider the sum $(\Delta n_1 \cdot d_1 + \Delta n_2 \cdot d_2)$ of retardations in the front-plane direction in the first phase plate and second phase plate. The retardation amount $(\Delta n_1 \cdot d_1)$ in the first phase plate and the retardation amount $(\Delta n_2 \cdot d_2)$ in the second phase plate may be distributed to the optical compensation elements 40A and 40B in any manner. The combination of the thicknesses of the optical members is optimized so that the sum may become substantially equal to the retardation amount $(\Delta n_{LC} \cdot d_{LC})$ in the front-plane direction in the liquid crystal layer. Thereby, a wide viewing angle and good display quality can be obtained, as described above.

Fourth Embodiment

In the above-described embodiments, the problem relating to coloring is solved by combining a plurality of phase plates having retardations in the front-plane direction. Alternatively, another method may be adopted. The liquid crystal panel 1 includes a red pixel, a green pixel and a blue pixel as color pixels of a plurality of colors. When a black image is displayed, a high voltage is applied to the liquid crystal layer in each color pixel. In other words, a black image is displayed by sufficiently reducing the transmittance of each color pixel (i.e. approaching the transmittance to zero).

Figure 11:
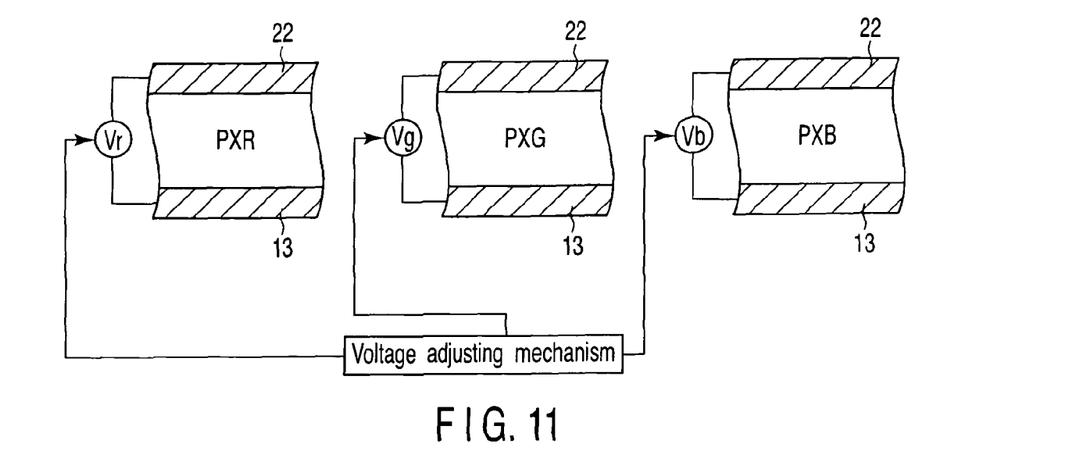
FIG. 11 schematically shows the structure of an OCB liquid crystal display device according to a fourth embodiment of the invention.

As is shown in FIG. 11, an OCB liquid crystal display device according to a fourth embodiment of the invention includes a voltage adjusting mechanism that individually adjusts levels of voltages to be supplied to different color pixels in order to display a black image. In the respective color pixels, the optimal condition for black image display is not the same. Thus, when the black image is to be displayed, the voltage adjusting mechanism supplies a driving voltage Vr to the red pixel PXR, a driving voltage Vg to the green pixel PXG, and a driving voltage Vb to the blue pixel PXB. The driving voltages V (r, g, b) are controlled to such levels as to adjust the retardations in the color pixels when the black image is displayed. By this method, the problem of coloring and wavelength dependency in the front-plane direction can be corrected.

Figure 12:
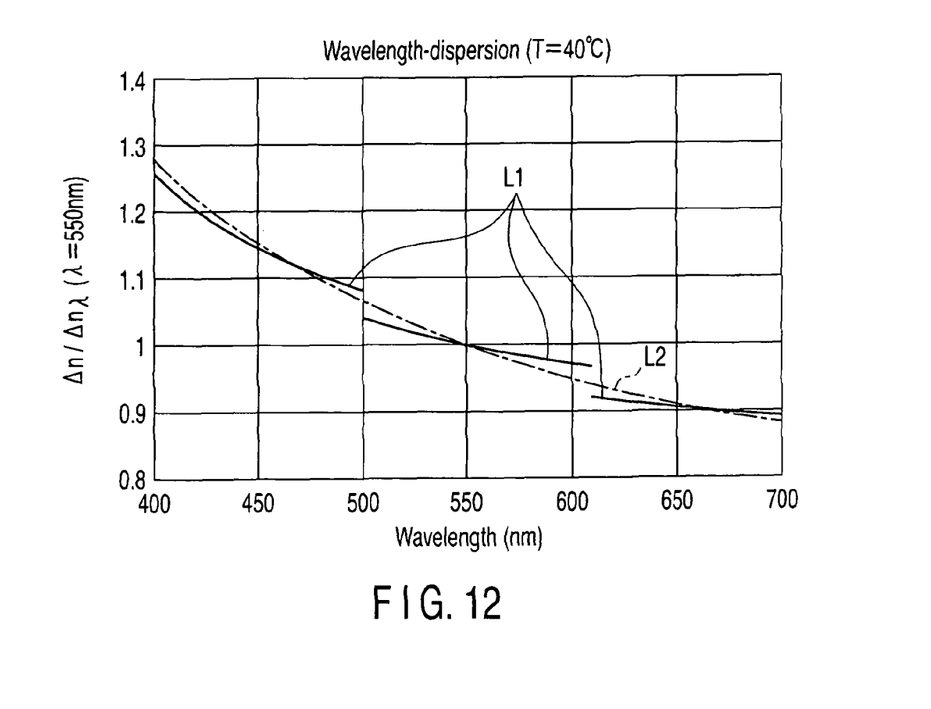
FIG. 12 shows an example of wavelength-dispersion characteristics of a retardation amount $\Delta n \cdot d$ in each of optical members in the liquid crystal display device in which a voltage adjusting mechanism is provided.

For example, when the optical compensation elements 40A and 40B as shown in FIG. 2 are combined with the liquid crystal panel 1 including the voltage adjusting mechanism, the liquid crystal layer 30 and the phase plates 43A and 43B with retardations in the front-plane direction in the respective color pixels have wavelength-dispersion characteristics of retardation amount $\Delta n \cdot d$, as shown in, e.g. FIG. 12. Like FIG. 6, FIG. 12 shows the wavelength-dispersion characteristics of the value $\Delta n/\Delta n_\lambda$, which is obtained by normalizing the retardation amount $\Delta n \cdot d$ relating to light of each wavelength by the retardation amount $\Delta n_\lambda \cdot d$ relating to light of the predetermined wavelength, i.e. λ=550 nm. In FIG. 12, a solid line L1 corresponds to the liquid crystal layer, and a dot-and-dash line L2 corresponds to the phase plate having retardation in the front-plane direction. In the liquid crystal panel 1 in this example, when a black image is displayed, the driving voltage Vb for the blue pixel PXB is set at 4.3V, the driving voltage Vg for the green pixel PXG is set at 4.5V, and the driving voltage Vr for the red pixel PXR is set at 4.6V.

As is shown in FIG. 12, with the provision of the voltage adjusting mechanism, the wavelength-dispersion characteristics of the liquid crystal layer in the respective pixels are sufficiently compensated, in particular, near the central wavelengths (450 nm, 550 nm and 650 nm) of the respective colors.

Thus, if the optical compensation elements in the above-described first to third embodiments are combined with the voltage adjusting mechanism that has been described here, a still wider viewing angle and higher display quality can be realized. Even in the case where optical compensation cannot completely be effected with the structures of the first to third embodiments and fine adjustment of characteristics needs to be executed, the provision of the above-described voltage adjusting mechanism is effective.

In some cases, fine adjustment with the first phase plate and second phase plate is difficult since there are not many choices for optimal materials of the first phase plate and second phase plate. In the case of combining the optical compensation elements of the first embodiment with the voltage adjusting mechanism, a good display quality of a black image was obtained when the voltage to be applied to the liquid crystal layer 30 of the green pixel was set at 4.5V, the voltage to be applied to the liquid crystal layer 30 of the blue pixel was set at 4.4V, and the voltage to be applied to the liquid crystal layer 30 of the red pixel was set at 4.5V. In addition, under these conditions, a good display quality was obtained with no degradation in color purity.

The present invention is not limited to the above-described embodiments. At the stage of practicing the invention, various embodiments may be made by modifying the structural elements without departing from the spirit of the invention. Structural elements disclosed in the embodiments may properly be combined, and various inventions may be made. For example, some structural elements may be omitted from the embodiments. Moreover, structural elements in different embodiments may properly be combined.

For example, each of the first phase plate and second phase plate with retardations in the front-plane direction may be a film in which optical anisotropic elements (e.g. discotic liquid crystal molecules) with negative uniaxiality are hybrid-aligned in the thickness direction of the phase plate, as well as the PC (polycarbonate) film or drawn TAC film. In addition, a film having a phase difference in the transmission-axis direction of the polarizer plate or a film having a phase difference in the thickness direction may be used for the first phase plate and second phase plate. In this case, a biaxial film may possibly be used.

The present invention can provide a liquid crystal display device with excellent display quality, which can increase a viewing angle and improve responsivity.

What is claimed is:

1. A transmissive optically compensated bend (OCB) liquid crystal display device comprising:
   a liquid crystal panel including red, green and blue color pixels, each of which is configured to include a liquid crystal layer held between a pair of substrates, the liquid crystal layer including liquid crystal molecules which in a display state are bend-oriented between the pair of substrate,
   a voltage adjusting mechanism to supply driving voltages to the red, green and blue color pixels,
   a pair of polarizer plates disposed at outer surfaces of the liquid crystal panel respectively, each having respective transmission axes which intersect at right angles with respect to each other; and
   a pair of optical compensation elements that optically compensate retardation of the liquid crystal layer in a predetermined display state in which a voltage is applied to the liquid crystal layer, each of the optical compensation elements disposed at outer surfaces of the liquid crystal panel respectively,
   wherein an image is displayed by varying a birefringence amount due to liquid crystal molecules included in the liquid crystal layer by the voltage applied to the liquid crystal layer,
   at least one of the optical compensation elements includes at least a first phase plate and a second phase plate, which have retardation in a front-plane direction and which respectively have an optical axis in a direction perpendicular to a direction of an orientation of the liquid crystal molecules, and
   when a value $\Delta n/\Delta n\lambda$ is set by normalizing a retardation amount $\Delta n \cdot d$ relating to light of each of wavelengths ($\Delta n = ne - no$ (ne: extraordinary-ray refractive index; no: ordinary-ray refractive index), and d is thickness) by a retardation amount $\Delta n\lambda \cdot d$ relating to light of a predetermined wavelength $\lambda$,
   a normalized value $\Delta n/\Delta n\lambda$ in the first phase plate is greater than a normalized value $\Delta n/\Delta n\lambda$ in the liquid crystal layer, and a normalized value $\Delta n/\Delta n\lambda$ in the second phase plate is less than the normalized value $\Delta n/\Delta n\lambda$ in the liquid crystal layer, with respect to light of wavelengths other than the predetermined wavelength and,
   wherein the voltage adjusting mechanism is configured to individually adjust the driving voltages in each color pixels in order to display a black image.

2. The liquid crystal display device according to claim 1, wherein the driving voltage for displaying the black image on the blue color pixel is different from the driving voltages for displaying the black image on the red and green color pixels.

3. The liquid crystal display device according to claim 1, wherein the first phase plate includes polycarbonate film.

4. The liquid crystal display device according to claim 1, wherein the second phase plate includes triacetyl cellulose film.

5. A transmissive optically compensated bend (OCB) liquid crystal display device comprising:
   a liquid crystal panel including red, green and blue color pixels, each of which is configured to include a liquid crystal layer held between a pair of substrates, the liquid crystal layer including liquid crystal molecules which in a display state are bend-oriented between the pair of substrates,
   a voltage adjusting mechanism to supply driving voltages to the red, green and blue color pixels,
   a pair of polarizer plates disposed at outer surfaces of the liquid crystal panel respectively, each of which transmission axes which intersect at right angles with respect to each other; and
   a pair of optical compensation elements that optically compensate retardation of the liquid crystal layer in a predetermined display state in which a voltage is applied to the liquid crystal layer, each of optical compensation elements disposed at outer surfaces of the liquid crystal panel respectively,
   wherein an image is displayed by varying a birefringence amount due to liquid crystal molecules included in the liquid crystal layer by the voltage applied to the liquid crystal layer,
   each of the optical compensation elements includes at least a first phase plate and a second phase plate, which have retardation in a front-plane direction and which respectively have an optical axis in a direction perpendicular to a direction of an orientation of the liquid crystal molecules, and
   when a value $\Delta n/\Delta n\lambda$ is set by normalizing a retardation amount $\Delta n \cdot d$ relating to light of each of wavelengths ($\Delta n = ne - no$ (ne: extraordinary-ray refractive index; no: ordinary-ray refractive index), and d is thickness) by a retardation amount $\Delta n\lambda \cdot d$ relating to light of predetermined wavelength $\lambda$,
   a normalized value $\Delta n/\Delta n\lambda$ in the first phase plate is greater than a normalized value $\Delta n/\Delta n\lambda$ in the liquid crystal layer, and a normalized value $\Delta n/\Delta n\lambda$ in the second phase plate is less than the normalized value $\Delta n/\Delta n\lambda$ in the liquid crystal layer, with respect to light of wavelengths other than the predetermined wavelength and,
   wherein the voltage adjusting mechanism is configured to individually adjust the driving voltages in each color pixels in order to display a black image.

6. The liquid crystal display device according to claim 5, wherein the first phase plate includes polycarbonate film, and the second phase plate includes triacetyl cellulose film.

7. The liquid crystal display device according to claim 2, wherein the driving voltage for displaying the black image on the red color pixel is different from the driving voltage for displaying the black image on the green color pixels.

8. A transmissive optically compensated bend (OCB) liquid crystal device comprising:
   a pair of substrates each of which has an electrode,
   a liquid crystal layer held between the pair of substrates,
   a pair of polarizer plates disposed at outer surfaces of the pair of substrates, each having respective transmission axes which intersect at right angles with respect to each other; and
   a pair of optical compensation elements that optically compensate retardation of the liquid crystal layer in a predetermined state in which a voltage is applied to the liquid crystal layer, each of optical compensation elements disposed at outer surfaces of the liquid crystal panel respectively, wherein at least one of the optical compensation elements includes at least a first phase plate and a second phase plate, which have retardation in a front-plane direction and which respectively have an optical axis in a direction perpendicular to a direction of an orientation of the liquid crystal molecules, and, when a value $\Delta n/\Delta n\lambda$ is set by normalizing a retardation amount $\Delta n \cdot d$ relating to light of each of wavelengths ($\Delta n = ne - no$ (ne: extraordinary-ray refractive index; no: ordinary-ray refractive index), and d is thickness) by a retardation amount $\Delta n\lambda \cdot d$ relating to light of predetermined wavelength $\lambda$, a normalized value $\Delta n/\Delta n\lambda$ in the first phase plate is greater than a normalized value $\Delta n/\Delta n\lambda$ in the liquid crystal layer, and a normalized value $\Delta n/\Delta n\lambda$ in the second phase plate is less than the normalized value $\Delta n/\Delta n\lambda$ in the liquid crystal layer, with respect to light of wavelengths other than the predetermined wavelength.

9. The liquid crystal device according to claim 8, wherein the first phase plate includes polycarbonate film.

10. The liquid crystal device according to claim 8, wherein the second phase plate includes triacetyl cellulose film.

11. A transmissive optically compensated bend (OCB) liquid crystal device comprising:

a liquid crystal panel including red, green and blue color pixels, each of which is configured to include a liquid crystal layer held between a pair of substrates, the liquid crystal layer including liquid crystal molecules which in a state are bend-oriented between the pair of substrate, a pair of polarizer plates disposed at outer surfaces of the liquid crystal panel respectively, each having respective transmission axes which intersect at right angles with respect to each other; and a pair of optical compensation elements that optically compensate retardation of the liquid crystal layer in a predetermined state in which a voltage is applied to the liquid crystal layer, each of optical compensation elements disposed at outer surfaces of the liquid crystal panel respectively, wherein at least one of the optical compensation elements includes at least a first phase plate and a second phase plate, which have retardation in a front-plane direction and which respectively have an optical axis in a direction perpendicular to a direction of an orientation of the liquid crystal molecules, and when a value $\Delta n/\Delta n\lambda$ is set by normalizing a retardation amount $\Delta n \cdot d$ relating to light of each of wavelengths ($\Delta n = ne - no$ (ne: extraordinary-ray refractive index; no: ordinary-ray refractive index), and d is thickness) by a retardation amount $\Delta n\lambda \cdot d$ relating to light of predetermined wavelength $\lambda$, a normalized value $\Delta n/\Delta n\lambda$ in the first phase plate is greater than a normalized value $\Delta n/\Delta n\lambda$ in the liquid crystal layer, and a normalized value $\Delta n/\Delta n\lambda$ in the second phase plate is less than the normalized value $\Delta n/\Delta n\lambda$ in the liquid crystal layer, with respect to light of wavelengths other than the predetermined wavelength.

* * * * *